June 22, 1943.                    H. R. MARINI                    2,322,582
                                 LAMINATED GLASS
                              Filed June 14, 1940

Inventor
HERMAN R. MARINI

By  Olen E. Bee
                                    Attorney

Patented June 22, 1943

2,322,582

UNITED STATES PATENT OFFICE 2,322,582

LAMINATED GLASS

Herman R. Marini, New Kensington, Pa., assignor to Pittsburgh Plate Glass Company, Allegheny County, Pa., a corporation of Pennsylvania Application June 14, 1940, Serial No. 340,505

4 Claims. (Cl. 154—2.74)

The present invention relates to laminated glass and more particularly to that form of laminated glass in which plastic interlayer material extends beyond and forms a border around the glass plates adhered thereto.

One object of the invention is the provision of a laminated glass in which a plastic material containing a reinforcing strip is employed to unite glass plates, the plastic material extending beyond the edges of the glass plates.

A second object of the invention is the provision of a laminated glass in which the plastic interlayer extends beyond the edges of the glass plates and serves as a means for securing the laminated glass into a supporting structure.

Other objects and advantages of the invention will become more apparent from the following detailed description of certain preferred embodiments thereof.

In ordinary practice, laminated glass is supported by means of framing elements which overlie the glass laminae of the composite plate. Normally, a cushioning strip of felt, rubber or other resilient material is introduced between the glass surface and the surrounding frame members to decrease the possibility of fracture of the glass. With the modern trend toward lighter constructions, the rigidity of the supporting elements is necessarily diminished and as a result of the flexibility of the supporting framework, undue stresses therein bring about a similar stress in the laminated glass supported therein and very often fracture of the glass itself.

In addition to the desire of obtaining a more satisfactory support for laminated glass there is, due to the increased use of streamlining, an increased demand for supporting means in which the laminated glass will be flush with the surface in which it is supported. Obviously, where the conventional frame surrounds the glass plate a true flush surface can never be obtained.

Briefly stated, the present invention contemplates a laminated glass in which the plastic interlayer extends beyond the edges of the glass plate to provide a means for positioning the laminated glass in a supporting structure without directly engaging the glass with a surrounding frame. The projecting marginal border of plastic is provided with a metallic strip embedded therein that extends inwardly between and slightly beyond the glass edges.

Figure 1:
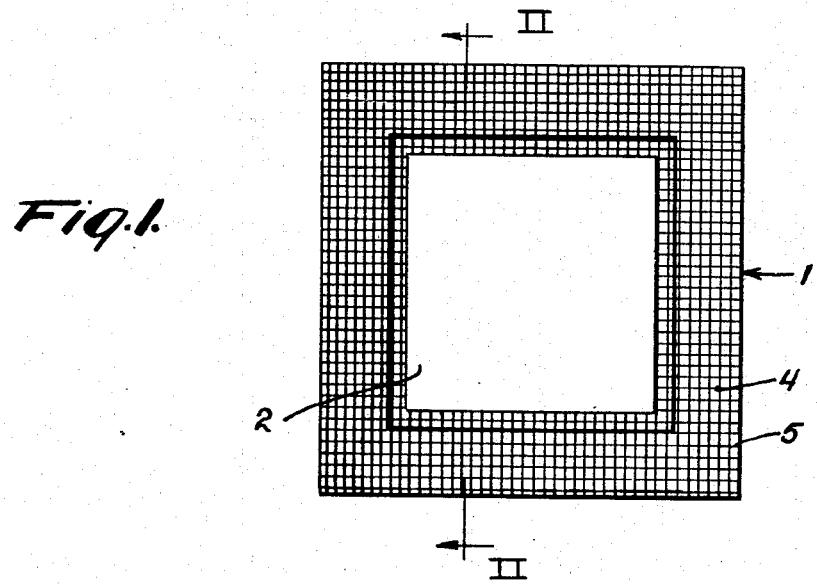
Figure 1 is a plan view of a laminated plate embodying the principles of my invention.
Figure 2:
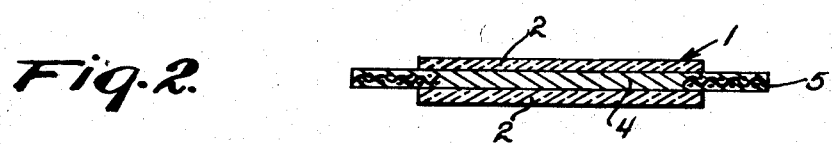
Figure 2 is a vertical sectional view taken substantially along the line II—II of Fig. 1.
Figure 3:
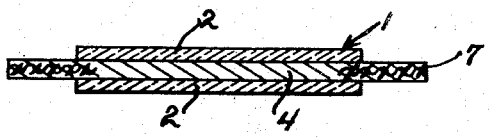
Figure 3 is a vertical sectional view of another form of my invention.

Referring to the drawing, a laminated unit 1 comprises glass plates 2 adhered to portions of the opposite sides of a layer 4 of plastic material, which has been strengthened by the inclusion therein of a reinforcing metallic strip 5 which can be in the form of wire mesh. The glass plates 2 are arranged centrally of the sheet 4 in order that portions of the plastic sheeting extend beyond the edges of and form a border around the glass plates. The reinforcing mesh 5 of wire, fabric or the like extends from the edges of the plastic layer 4 inwardly of the edges of the glass plates, in order to strengthen the projecting portions of the plastic, particularly at the line of union thereof with the glass plates. At the same time the reinforcing mesh should not extend inwardly of the laminated plate to such extent that it will impair the efficiency of the laminated glass by restricting visibility therethrough. Fabric forming the reinforcing mesh 7 (Fig. 3) may be substituted for the wire mesh 5 if it is so desired. A closely woven fabric such as pomona cloth, when employed, will cause the projecting border of plastic and the edges of the glass plates to be translucent.

Laminated glass of this type may be produced by introducing a reinforcing mesh of wire or fabric cut to the proper shape, with the central portion thereof removed, between a plurality of layers of a plastic material. The plastic material will ordinarily be that employed in the manufacture of the standard safety glass, including the polyvinyl acetal resins, cellulose acetate, the acrylate resins and the like. Since the plastic material is to be used for supporting the complete plate, it will of necessity be considerably thicker than the layer of plastic ordinarily used to unite the glass plates of safety glass. A plastic layer of approximately 0.15 of an inch in thickness when reinforced at its borders as contemplated will be sufficient. The layers of plastic material with the interposed reinforcing mesh are then placed between glass plates which are of smaller dimensions than the plastic material and the remaining portions of the plastic layer are masked with an inert substance such as Cellophane, soap, borax, etc. The assembly is placed in a rubber bag from which the air is evacuated and subjected to controlled heat and pressure, to weld the several elements into a composite unit. The particular heat and pressure employed will, of course, depend upon the nature of the plastic material used in the interlayer. Since they follow the practices which are well known to the art it is not considered necessary to set them forth in specific detail herein.

After the laminating operation has been completed, the Cellophane or other masking substance may be removed from the plastic borders of the composite plate, although this is not necessary since the borders will be covered. The laminated glass, when supported in a structure, solely through the plastic border, will in effect be floating in such structure. Accordingly, the glass laminae of the plate will not be subject to stresses and the possibility of fracture.

It will at once be obvious that various modifications and the nature of the several elements of the laminated glass and their arrangements can be made without departing from the spirit of the invention or the scope of the appended claims.

What I claim is:

1. A laminated glazing unit comprising a sheet of mesh material having its central portion open to define an endless framing member, a plastic interlayer having the mesh embedded therein and along its edges to form a border of plastic and mesh, and glass plates adhered to opposite sides of the interlayer, the inner edges of the mesh extending inwardly of the glass plate edges and the outer edges of the mesh extending outwardly beyond the glass edges.

2. A laminated glazing unit comprising a sheet of adhesive plastic interlayer material, a mesh strip embedded in the plastic sheet throughout its border portions and glass plates adhered to opposite sides of the sheet with a substantial border of the sheet projecting from all edges of the glass, said mesh extending throughout the projecting border of the plastic and overlapping inwardly the glass edges between said plates.

3. A laminated glazing unit comprising a sheet of metallic material having its central portion open to define an endless framing member, a plastic interlayer having the sheet material embedded therein and along its edges to form a composite border of plastic and metallic sheet material, and glass plates adhered to opposite sides of the interlayer, the inner edges of the sheet material extending inwardly of the glass plate edges and the outer edges of said material extending outwardly beyond the glass edges.

4. A laminated glazing unit comprising a sheet of adhesive plastic interlayer material, a metal strip embedded in the plastic sheet throughout its border portions, and glass plates adhered to opposite sides of the interlayer sheet with a substantial border of the sheet projecting from all edges of the glass, said strip extending throughout the projecting border of the plastic and overlapping inwardly the glass edges between said plates.

HERMAN R. MARINI.